United States Patent [19]
Erickson

[11] 3,923,335
[45] Dec. 2, 1975

[54] CAMPER UNIT FOR SNOWMOBILE TRAILERS

[76] Inventor: Jerome A. Erickson, 5816 Decatur Ave. North, New Hope, Minn. 55428

[22] Filed: Aug. 22, 1974

[21] Appl. No.: 499,439

[52] U.S. Cl. .............. 296/23 R; 280/12 S; 214/85; 296/1 A; 296/23 A
[51] Int. Cl.² ............................................ B60P 3/34
[58] Field of Search........... 296/23 R, 23 A, 23 MC, 296/23 B, 1 R, 1 A; 280/12 C, 12 S, 8; 180/5 R; 214/85, 500

[56] References Cited
UNITED STATES PATENTS

| | | | |
|---|---|---|---|
| 1,285,794 | 11/1918 | Reid | 296/23 A |
| 2,464,884 | 3/1949 | Noyes | 280/12 S |
| 3,464,735 | 9/1969 | Smith | 296/23 R |
| 3,604,747 | 9/1971 | Gorman | 296/23 B |
| 3,613,920 | 10/1971 | Flamm | 296/1 A |
| 3,653,677 | 4/1972 | Fraser | 280/8 |
| 3,788,670 | 1/1974 | Peterson | 296/23 A |

FOREIGN PATENTS OR APPLICATIONS

| 168,940 | 1/1951 | Austria | 296/23 A |
|---|---|---|---|

*Primary Examiner*—Robert G. Sheridan
*Assistant Examiner*—Gary Auton
*Attorney, Agent, or Firm*—Merchant, Gould, Smith, Edell, Welter & Schmidt

[57] ABSTRACT

A combination unit comprising a camper and a snow vehicle. The unit includes a hollow, sledge type casing arranged to be secured to a double snowmobile trailer, and having downwardly projecting runners and a front wall so configured that the unit rides on the surface of snow when towed behind a snowmobile by a rigid, removable draw bar. A pair of bunk panels carrying mattresses are hinged internally to side walls of the carrier at different heights, for pivotal movement between inboard and outboard positions, and adjustable leg members are provided to support the outer corners of the panels whether the unit is on the trailer or on the snow. A canvas structure is removably supported over the casing on arches, and is secured to the casing around its bottom. The canvas structure may be folded, and the arches and leg members may be disassembled, for transportation within the casing on top of the panels, all being protected during transportation by a travel cover. A deck member is removably mounted on the casing and cover, to support at least one self-propelled vehicle such as a snowmobile secured thereto. The bottom of the casing includes an inwardly hinged ice fishing door which is normally maintained in its closed position. The bunk panels are shorter at their front ends than the top of the casing, and the canvas structure has floor tabs to complete the enclosure of the space above the casing. Means are also provided to prevent movement of the unit on its runners under the force of wind. The back wall of the casing is equipped with a door to facilitate access. A loading ramp is provided to facilitate mounting self-propelled vehicles on the deck member and removing them therefrom, when the unit is mounted on the trailer, and the ramp may be used either forward or backward.

1 Claim, 4 Drawing Figures

U.S. Patent  Dec. 2, 1975  Sheet 1 of 2  3,923,335
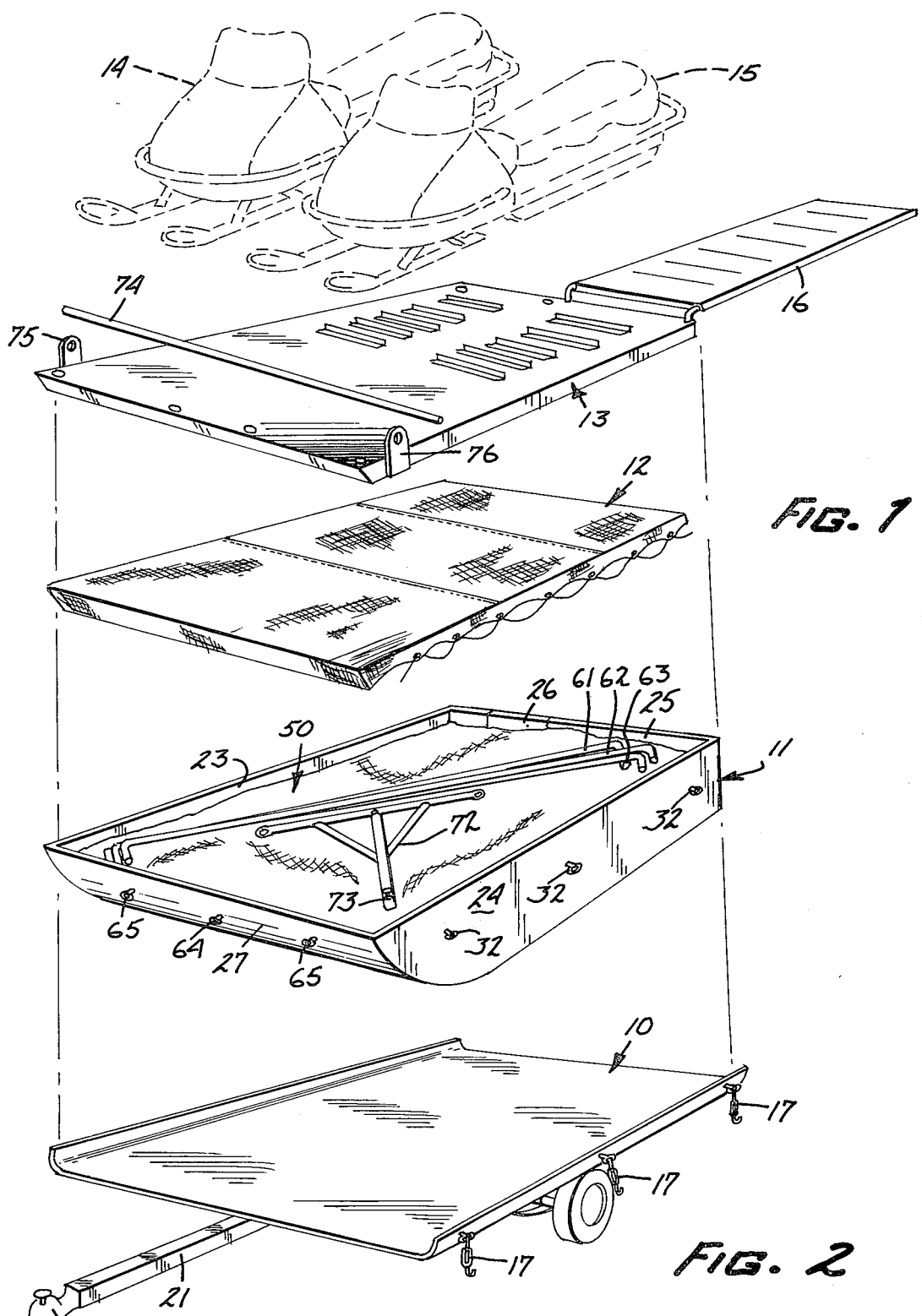
FIG. 1
FIG. 2
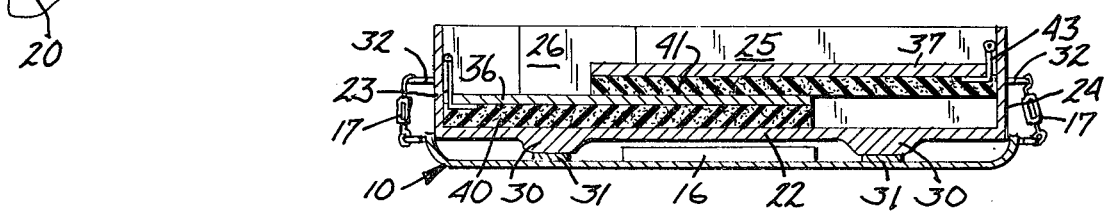

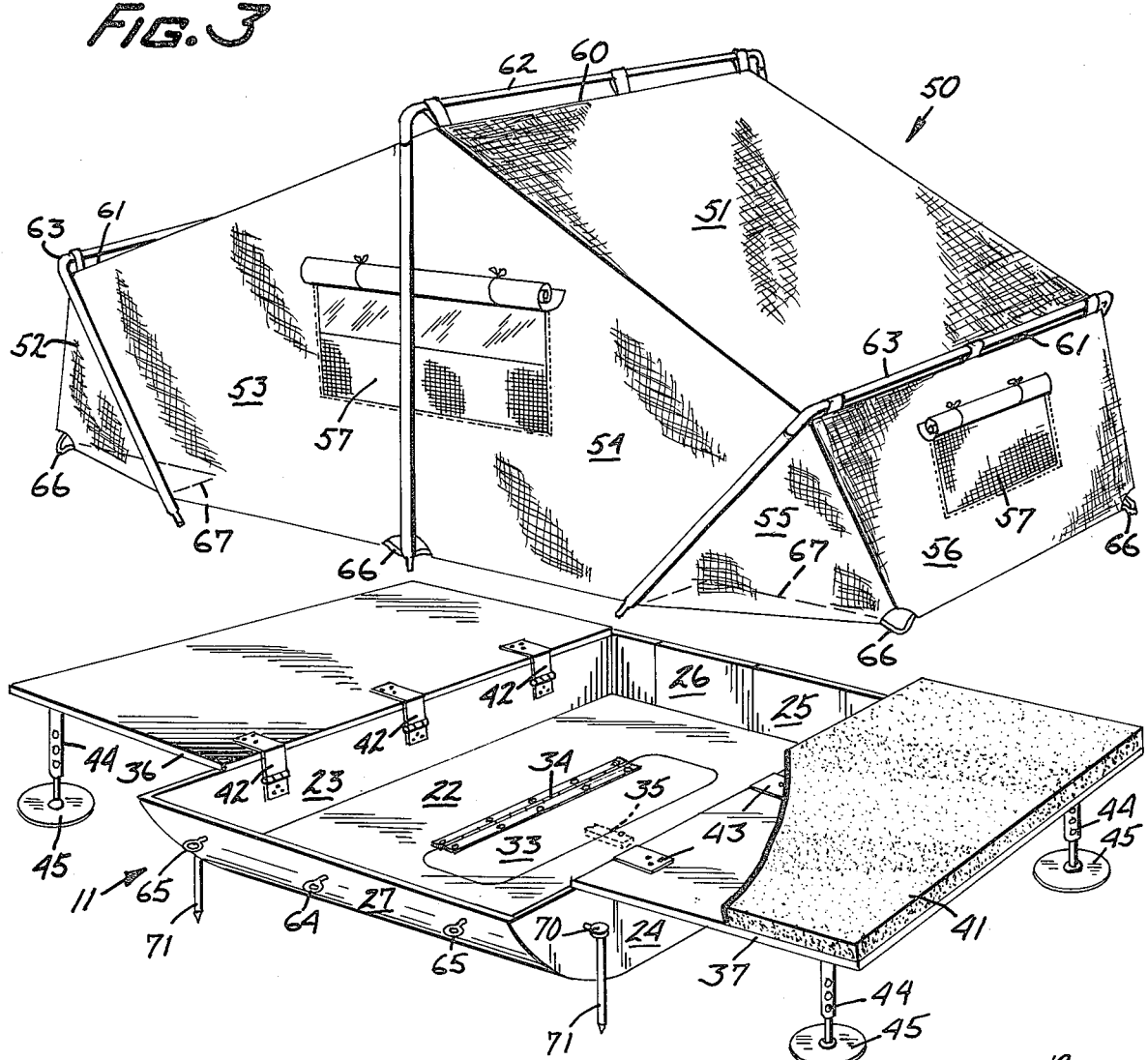
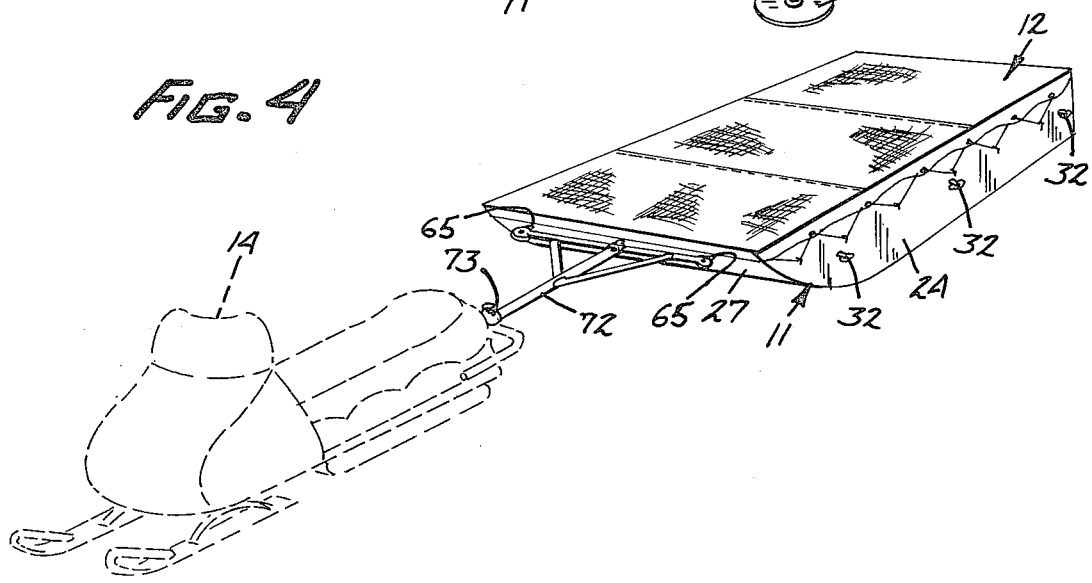

CAMPER UNIT FOR SNOWMOBILE TRAILERS

BACKGROUND OF THE INVENTION

This invention relates to the general field of sportsmen's equipment, and comprises a combined unit functioning both as a camper and as a snow vehicle.

The word camper has taken on the special meaning of a structure mounted in a truck or similar vehicle to provide living quarters for those traveling in the truck. Campers thus provide the travelers with a place to relax and rest wherever their vehicle can go and have become justly popular.

Another item which has become very popular is the snowmobile. These vehicles are no longer of use only to those living in rural areas, since trailers have been produced for carrying one or more snowmobiles to snow. Of course it is possible for snowmobile riders to couple their snowmobile trailer to a truck carrying a camper, and thus provide themselves with a base from which to carry on their recreational activities. This base must however be accessible by the wheeled vehicle.

SUMMARY OF THE INVENTION

My invention is a unit which is adapted to be carried with the snowmobiles on their trailer as far as wheel traffic is possible, and then dismounted from the trailer and towed in unbroken snow by a snowmobile. When desired the unit is convertible to a tent type camper giving its occupants protection and shelter wherever their snowmobile can take them. In the field of recreation my unit is usable by ice fishermen and hunters, as a portable ski or ice skating shelter, or as an output headquarters for cross country snowmobile races or cross country skiing In non-recreational areas my unit may be used for working a trap line, as an emergency winter shelter, or in forest conservation winter activities.

My unit is not limited to use in winter, but can equally successfully be erected and inhabited while still mounted on the trailer.

It is a principle object of the invention to provide a new and useful combination unit functioning both as a camper and as a snow vehicle. Another object is to provide such a unit which is readily transportable by snowmobilers with their snowmobiles. A more specific object is to provide a unit which acts as a snow vehicle when towed behind a snowmobile, but which can be converted to a camper providing protection and shelter for the snowmobilers at any point in a route through unbroken snow. Another object of the invention is to provide such a unit which may be erected and inhabited whether or not it is removed from the snowmobile trailer.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, to the accompanying descriptive matter, in which there is illustrated and described a preferred embodiment of the invention.

BRIEF DESCRIPTION OF THE DRAWING

In the drawing;

FIG. 1 is an exploded view of elements used in practicing my invention;

FIG. 2 is a cross sectional view of an element of the invention;

FIG. 3 is an exploded view of elements of my invention in a different mode; and

FIG. 4 shows my invention in transportation on snow.

DESCRIPTION OF THE PREFERRED EMBODIMENT

A snowmobilers' outfit for practicing my invention is shown in FIG. 1 to comprise a double snowmobile trailer 10, a camper unit 11, a travel cover 12, and a deck member 13 for a pair of self-propelled vehicle such as snowmobiles 14 and 15, including a loading ramp 16. Trailer 10 may be conventional, is preferably without a central divider, and is provided with turnbuckles 17 or similar means for securing a load thereto. It is designed to be coupled to a towing vehicle by a trailer hitch 20 carried at the end of a tongue 21.

Unit 11 is best understood with respect to FIGS. 1, 2, and 3. It comprises a hollow sledge type casing having a bottom 22, side walls 23 and 24, a rear wall 25 with a hinged door 26, and a front wall 27. A pair of low runners 30 project downwardly from bottom 23, and may be provided with steel shoes 31 for protection and wear resistance. By "sledge type" I intend to define a structure which essentially rests on the snow, rather than being supported clear of the snow by runners or ski devices the necessary height. Means 32 are provided along the sides of unit 11 for cooperating with elements 17 to secure the unit to trailer 10. The bottom of the unit may be provided with a door 33 hinged at 34 to open inwardly, and normally held securely shut by means suggested at 35, for use in ice fishing.

A pair of bunk panels 36 and 37 are hinged inwardly to walls 23 and 24 respectively and carry mattresses 40 and 41 of foam rubber or other appropriate material. The hinges 42 for panel 40 are different from the hinges 43 for panel 41, to permit the panels to pivot inwardly into first positions where mattress 40 rests on bottom 22 and supports panel 36 generally parallel to the bottom, and mattress 41 rests on panel 36 and supports panel 37 generally parallel to the bottom.

The panels pivot on hinges 42 and 43 into second positions in which they extend outwardly from the tops of sides 23 and 24, the mattresses now being upward. The outer corners of the panels are supported by adjustable leg members 44. Bases 45 of large area may be provided to prevent leg members 44 from sinking into soft surfaces if such are encountered.

Shelter and protection are provided by a folding canvas structure 50 having roof panels, one of which is shown at 51, and wall panels, five of which are shown at 52, 53, 54, 55, and 56. Screened windows 57 may be supplied in wall panels if desired. Structure 50 has a ridge 60 and eaves 61, at which the structure is supported by arch members 62, 63 having horizontal spans from which legs extend to suitable eyes or sockets 64, 65 carried in wall 27 and also in rear wall 25. For convenience in transportation, the spans of the arch members may be readily disassembled from the legs of the members.

As suggested at 66 in FIG. 3, the lower edges of the canvas walls are secured to walls 25 and 27 and the edges of panels 36 and 37 to form a complete enclosure. A flap or door may be provided in the canvas wall at the location of door 27 in wall 25.

FIG. 3 also shows that the bunk panels are shorter at their front ends than the top of the casing. The canvas structure is provided with floor tabs 67 to complete the enclosure of the space above the casing.

When my camper is erected for habitation, it presents considerable area to the wind: if the latter is of some force and comes from behind the unit, it could very well cause the latter to move, particularly if it is resting on snow or ice. To prevent this, I secure guides, such as tubes or eyes 70, to the sides of the casing, through which stakes 71 can be driven into the snow or ice to anchor the unit in the desired location.

The erected condition of my camper is suggested in FIG. 3. When it is desired to transport the unit on snow, the canvase canvas is taken down and folded, the arches are disassembled, and the bunk panels are folded inward to their first positions. The folded canvas structure, the disassembled arches, and the leg members are placed in the casing, and travel cover 12 is placed over the casing and laced into position. Now when a towbar 72 is secured to the front of the unit, and connected to a snowmobile by a suitable hitch 73, the entire arrangement may be taken on to a new camping ground, or back to where the trailer 10 has been left. It is important that towbar 72 be rigid to prevent unit 11 from overrunning the snowmobile on downward slopes.

Upon return to the starting point, unit 11 is separated from the snowmobile and drawn up onto trailer 10, where it is secured by means 17 and 32: towbar 72 may be stored in the unit, as suggested in FIG. 1. Deck member 13 is positioned on top of the unit and the snowmobile or snowmobiles are driven up ramps 16 and secured to the deck member by any suitable means, which may include a rod 74 passing through aligned holes in a pair of plates 75 and 76. Ramp 16 may be stored on trailer 10 between runners 30 as suggested in FIG. 2, and road transportation of the assembly is again possible.

While I have described my apparatus as used for winter camping on snow, it should be understood that summer camping is also possible using this equipment. Leg members 44 are adjustable to support bunk panels 36 and 37 from the ground while unit 11 remains mounted on trailer 10. For this form of camping the presence of door 26 is especially convenient.

It will be appreciated that for summer use deck member 13 may be arranged to secure one or more motorcycles, a boat, or other vehicles appropriate to the season.

A special feature of my arrangement is its compactness. Storage of camping equipment when it is not in use is always a problem, and my members 11, 12, and 13 may be stored on their side, for example, in suprisingly little space.

From the foregoing it will be evident that I have invented a combined unit for recreational use which functions as a camper in winter or in summer, and as its own snow vehicle for towing behind a snowmobile in winter, and which moreover can be combined with a pair of snowmobiles and a double trailer to give a winter sport arrangement of great versitility.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A travel accessory comprising in combination:
   a wheeled trailer including means for coupling said trailer to be towed by a road vehicle;
   a sledge type of camper casing containing a collapsed camper and having an open top, a snow engaging bottom including longitudinally extending runners, and side walls capable of supporting a load;
   removable means including a rigid towbar for connecting said casing to be towed over snow by a snowmobile;
   means removably securing said casing to said trailer;
   a removable travel cover secured over the top of said casing to protect the content thereof;
   a removable load bearing deck member carried on said side walls and extending over said open top;
   and a means for removably securing a self-powered vehicle to said deck member for transportation behind the wheel vehicle, on said trailer and above said casing.

* * * * *